(12) United States Patent
Schopperle et al.

(10) Patent No.: US 7,748,957 B2
(45) Date of Patent: Jul. 6, 2010

(54) LIVEWELL/BAITWELL PUMP FEATURING REPLACEABLE LOCKING CARTRIDGE FEATURE

(75) Inventors: Jeff Schopperle, Wakefield, MA (US); Scott Batchelder, Newbury, MA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1292 days.

(21) Appl. No.: 11/252,974

(22) Filed: Oct. 17, 2005

(65) Prior Publication Data
US 2007/0084805 A1    Apr. 19, 2007

(51) Int. Cl.
*F03B 11/02* (2006.01)
(52) U.S. Cl. .................................... 415/214.1
(58) Field of Classification Search ............. 415/214.1; 210/232, 416.1, 416.2, 767; 220/200, 210, 220/212; 43/54.1, 55, 56, 57; 417/360, 361, 417/423.14, 423.15, 423.3
See application file for complete search history.

(56) References Cited

U.S. PATENT DOCUMENTS

| | | | | |
|---|---|---|---|---|
| 1,599,685 A | * | 9/1926 | Spaeth | 220/210 |
| 2,334,380 A | * | 11/1943 | Brinker | 24/67.7 |
| 3,861,831 A | | 1/1975 | Rule | |
| 4,182,361 A | * | 1/1980 | Oakey | 137/296 |
| 5,044,883 A | * | 9/1991 | Neueder | 415/214.1 |
| 5,058,242 A | * | 10/1991 | Liu et al. | 24/67.7 |
| 5,145,141 A | * | 9/1992 | Hunter | 248/452 |
| 5,181,838 A | | 1/1993 | Sato et al. | |
| 5,312,082 A | * | 5/1994 | Chang | 248/452 |
| 5,538,406 A | | 7/1996 | Siegal et al. | |
| 5,711,652 A | | 1/1998 | Van De Venne et al. | |
| 5,725,250 A | * | 3/1998 | Balderrama | 281/45 |
| 6,045,340 A | | 4/2000 | Batchelder et al. | |
| 6,174,142 B1 | | 1/2001 | Holt | |
| 6,216,996 B1 | * | 4/2001 | Shamoon | 248/452 |
| 6,276,908 B1 | | 8/2001 | Batchelder et al. | |
| 6,715,994 B2 | | 4/2004 | Patel et al. | |
| 6,883,264 B1 | * | 4/2005 | Gimbel | 43/6 |

(Continued)

FOREIGN PATENT DOCUMENTS

GB      2360067 A   *   9/2001

*Primary Examiner*—Edward Look
*Assistant Examiner*—Aaron R Eastman

(57) ABSTRACT

A livewell/baitwell pump includes a replaceable cartridge for arranging in a pump cartridge body of a pump cartridge assembly. The replaceable cartridge is rotatably coupled to the pump cartridge body and locked in place by a pre-loaded locking lever that securely engages a locking edge of the pump cartridge body and holds the replaceable cartridge therein. The pre-loaded locking lever is spring-loaded and pivotally arranged on the replaceable cartridge to snap into place and lock the replaceable cartridge when the locking lever is rotated passed the locking edge, so that the replaceable cartridge may be installed in the cartridge body using one hand. In operation, when the replaceable cartridge is rotated into the pump-cartridge body to a desired locking position, the pre-loaded locking lever engages the locking edge of the pump cartridge body. The locking edge is formed on an annular rim on the pump cartridge body as a raised edge. Moreover, the pre-loaded locking lever is pressed inwardly, then twisted in order to remove the replaceable cartridge from the pump cartridge body, so that the replaceable cartridge may be removed from the cartridge body using one hand. The pre-loaded locking lever includes a bias member, such as a spring or other suitable elastic member or material, for continuously urging the pre-loaded locking lever against the replaceable cartridge.

18 Claims, 2 Drawing Sheets

U.S. PATENT DOCUMENTS

2002/0096895 A1* 7/2002 McCarthy ................... 294/1.5
2003/0019316 A1* 1/2003 Tews ..................... 74/471 XY
2003/0132158 A1* 7/2003 Clausen et al. ............. 210/450
2004/0147209 A1* 7/2004 Bickford et al. ............. 451/451
2004/0191090 A1 9/2004 Patel et al.
2005/0056124 A1* 3/2005 Zulauf et al. .................. 81/120

* cited by examiner

LIVEWELL/BAITWELL PUMP FEATURING REPLACEABLE LOCKING CARTRIDGE FEATURE

CROSS-REFERENCE TO RELATED APPLICATION

This application is related to a corresponding application filed on the same day as the present application and identified by a patent application serial no., which is hereby incorporated by reference in its entirety.

BACKGROUND OF THE INVENTION

The present invention relates to a pump; and more particularly to a livewell/baitwell pump.

SUMMARY OF THE INVENTION

The present invention provides a new and unique pump, such as a livewell/baitwell pump, having a replaceable cartridge for arranging in a pump cartridge body of a pump cartridge assembly, wherein the replaceable cartridge is rotatably coupled to the pump cartridge body and locked in place by a pre-loaded locking lever that securely engages a locking edge of the pump cartridge body and holds the replaceable cartridge therein.

The pre-loaded locking lever is spring-loaded and pivotally arranged on the replaceable cartridge to snap into place and lock the replaceable cartridge when the locking lever is rotated past the locking edge, so that the replaceable cartridge may be installed in the cartridge body using one hand. In operation, when the replaceable cartridge is rotated into the pump cartridge body to a desired locking position, the pre-loaded locking lever engages the locking edge of the pump cartridge body. The locking edge is formed on an annular rim on the pump cartridge body as a raised edge. Moreover, the pre-loaded locking lever is pressed inwardly, then twisted in order to remove the replaceable cartridge from the pump cartridge body, so that the replaceable cartridge may be removed from the cartridge body using one hand. The pre-loaded locking lever includes a bias member, such as a spring or other suitable elastic member or material, for continuously urging the pre-loaded locking lever against the replaceable cartridge.

The replaceable cartridge includes protruding members for rotationally coupling with corresponding threads of the pump cartridge body for grabbing, drawing and seating the replaceable cartridge therein. The replaceable cartridge is twisted downwardly into the pump cartridge body a ¼ turn to a desired locking position.

The pre-loaded locking lever makes an audible latch verification sound when the pre-loaded locking lever is coupled to the locking edge as the replaceable cartridge is seated and securely fastened in the pump cartridge body, allowing the user to easily secure the replaceable cartridge in areas not readily accessible and in some cases not visible.

The replaceable cartridge may also include a rubber type over-mold that allows for a firm grip in a wet environment which enhances the removal and installation of the replaceable cartridge.

The present invention also includes a method arranging the replaceable cartridge in the pump cartridge body of the pump cartridge assembly of a pump, featuring the step of rotatably coupling the replaceable cartridge to the pump cartridge body; and locking the replaceable cartridge in place by the pre-loaded locking lever that securely engages the locking edge of the pump cartridge body and holds the replaceable cartridge therein.

BEST MODE FOR CARRYING OUT THE INVENTION

Figure 1:
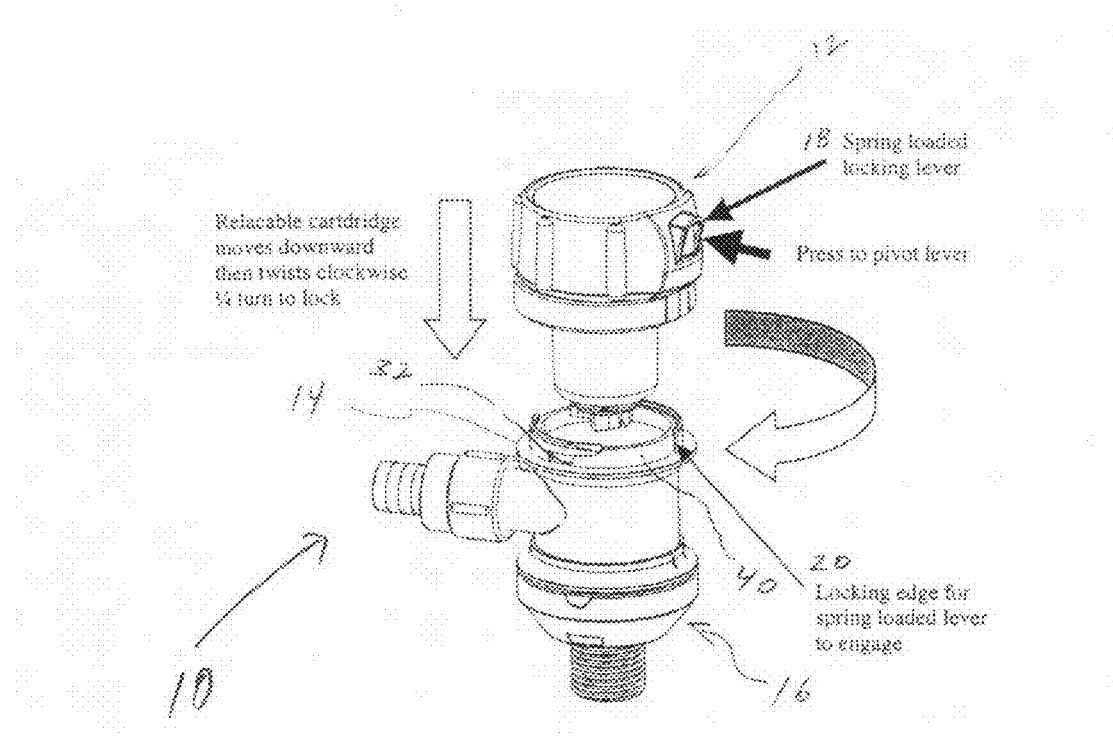
FIG. 1 is a perspective view of a livewell/baitwell pump according to the present invention.
Figure 2:
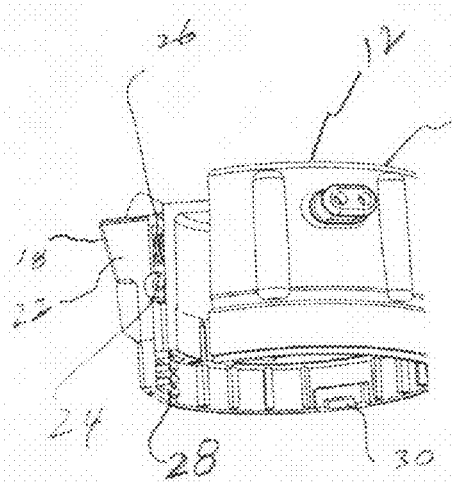
FIG. 2 is a perspective cutaway view of a top part of a pump cartridge body of a pump cartridge assembly of the livewell/baitwell pump shown in FIG. 1.
Figure 3:
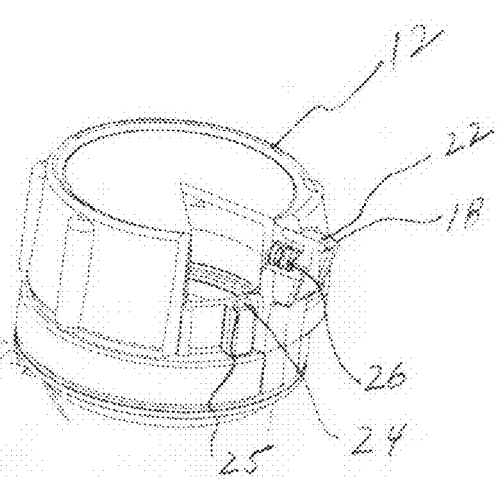
FIG. 3 is another perspective cutaway view of a top part of a pump cartridge body of a pump cartridge assembly of the livewell/baitwell pump shown in FIG. 1.
Figure 4:
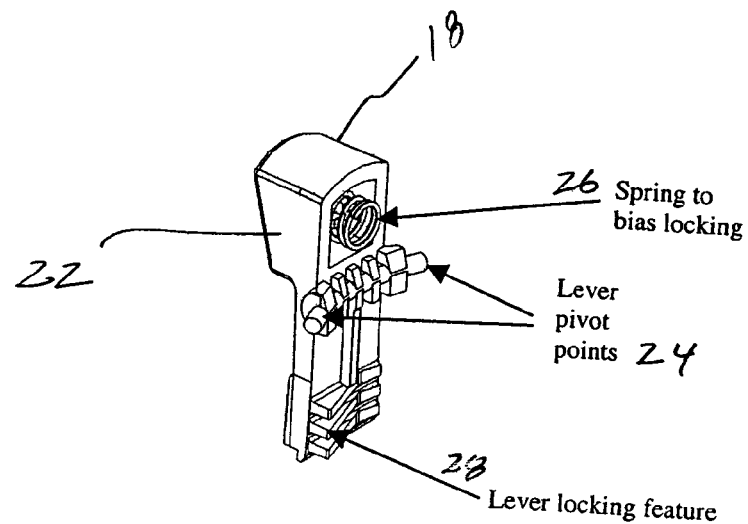
FIG. 4 is a view of a pre-loaded locking lever in according to the present invention.
Figure 5:
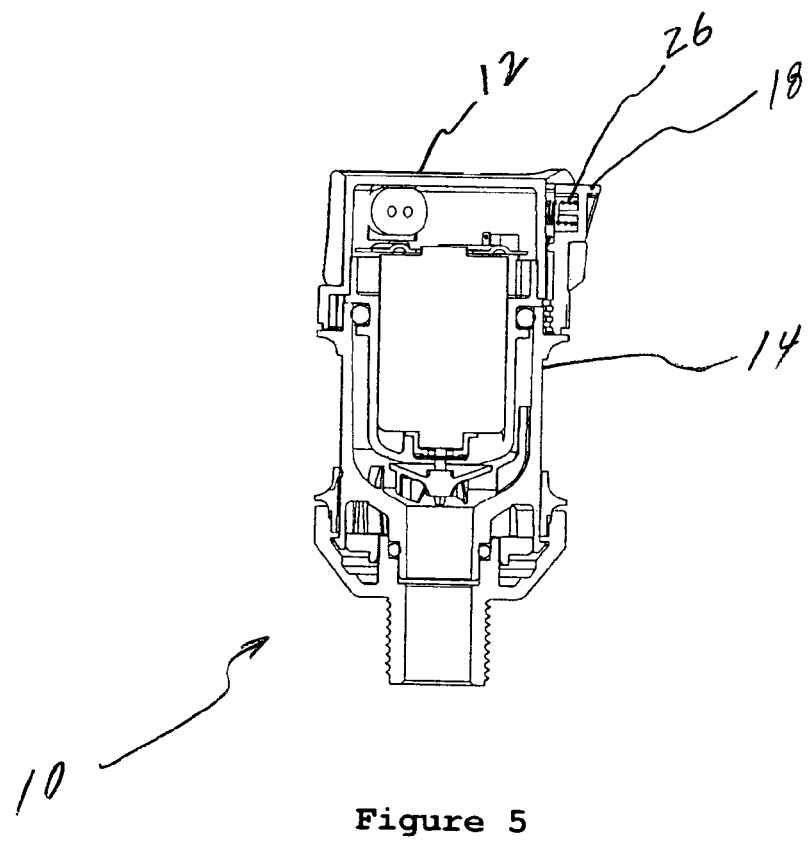
FIG. 5 is a cross-sectional view of a livewell/baitwell pump according to the present invention.

FIG. 1 shows a new and unique a pump, such as a livewell/baitwell pump generally indicated as 10, having a replaceable cartridge 12 for arranging in a pump cartridge body 14 of a pump cartridge assembly generally indicated as 16, which is shown and described in detail the aforementioned patent application serial no. The replaceable cartridge 12 is rotatably coupled to the pump cartridge body 14 and locked in place by a pre-loaded locking lever 18 that securely engages a locking edge 20 of the pump cartridge body 14 and holds the replaceable cartridge 12 therein.

As shown in FIGS. 2-5, the pre-loaded locking lever 18 is spring-loaded (FIG. 4) and pivotally arranged on the replaceable cartridge 12 to snap into place and lock the replaceable cartridge 12 when the locking lever 18 is rotated past the locking edge 20, so that the replaceable cartridge 12 may be installed in the pump cartridge body 14 using one hand. The pre-loaded locking lever 18 has a housing 22 having lever pivot points 24 arranged in corresponding pivot slots 25 (FIG. 3) of the cartridge body 14 and also contains a spring 26. In operation, when the replaceable cartridge 12 is rotated into the pump cartridge body 14 to a desired locking position, the pre-loaded locking lever 18 engages the locking edge 20 of the pump cartridge body 14. The spring 26 or other suitable elastic member or material continuously urges a locking lever feature 28 of the pre-loaded locking lever 18 against the locking edge 20 of the pump cartridge body 14. The locking edge 20 is formed on an annular rim 40 on the pump cartridge body 14 as a raised edge. Moreover, the pre-loaded locking lever 18 is pressed inwardly, then twisted in order to remove the replaceable cartridge 12 from the pump cartridge body 14, so that the replaceable cartridge 12 may be removed from the pump cartridge body 14 using one hand.

The replaceable cartridge 12 includes protruding members 30 for rotationally coupling with corresponding threads 32 of the pump cartridge body 14 for grabbing, drawing and seating the replaceable cartridge 12 therein. The replaceable cartridge 12 is twisted downwardly into the pump cartridge body a ¼ turn to a desired locking position.

The pre-loaded locking lever 18 makes an audible latch verification sound when it is coupled to the locking edge 20 as the replaceable cartridge 12 is seated and securely fastened in the pump cartridge body 14, allowing the user to easily secure the replaceable cartridge in areas not readily accessible and in some cases not visible.

The replaceable cartridge 12 may also include a rubber type over-mold or other suitable material that allows for a firm grip in a wet environment which enhances the removal and installation of the replaceable cartridge 12.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein without departing from the spirit and scope of the present invention.

The invention claimed is:

1. A pump having a replaceable cartridge for arranging in a pump cartridge body that forms part of a pump cartridge assembly, the pump comprising:
   a replaceable cartridge configured with one or more protruding members and a pre-loaded locking lever having a locking lever feature;
   a pump cartridge body configured with one or more corresponding threads and a locking edge;
   the replaceable cartridge being rotatably coupled to the pump cartridge body by rotating the replaceable cartridge in the pump cartridge body about a ¼ turn to a desired locking position so that the one or more protruding members rotationally couple with the one or more corresponding threads for grabbing, drawing and seating the replaceable cartridge in relation to the pump cartridge body, and so that the locking lever feature of the pre-loaded locking lever rotates past and securely engages the locking edge of the pump cartridge body and locks the replaceable cartridge in relation to the pump cartridge body.

2. A pump according to claim 1, wherein the pre-loaded locking lever is spring-loaded and pivotally arranged on the replaceable cartridge to snap into place and lock the replaceable cartridge when the locking lever is rotated past the locking edge, so that the replaceable cartridge may be installed in the cartridge body using one hand.

3. A pump according to claim 1, wherein the pre-loaded locking lever is first pressed inwardly, then twisted in order to remove the replaceable cartridge from the pump cartridge body, so that the replaceable cartridge may be removed from the pump cartridge body using one hand.

4. A pump according to claim 1, wherein the pre-loaded locking lever has a housing having lever pivot points and contains a spring.

5. A pump according to claim 1, wherein the pre-loaded locking lever includes a bias member, such as a spring or other suitable elastic member or material, for continuously urging the pre-loaded locking lever against the replaceable cartridge.

6. A pump according to claim 1, wherein the locking edge is formed on an annular rim on the pump cartridge body as a raised edge.

7. A pump according to claim 1, wherein the pre-loaded locking lever makes an audible latch verification sound when the pre-loaded locking lever is coupled to the locking edge as the replaceable cartridge is seated and securely fastened in the pump cartridge body, allowing the user to easily secure the replaceable cartridge in areas not readily accessible and in some cases not visible.

8. A pump according to claim 1, wherein the replaceable cartridge has a rubber type over-mold that allows for a firm grip in a wet environment which enhances the removal and installation of the replaceable cartridge.

9. A pump according to claim 1, wherein the pump is a livewell/baitwell pump.

10. A method comprising:
    inserting a replaceable cartridge configured with one or more protruding members and a pre-loaded locking lever having a locking lever feature into a pump cartridge body configured with one or more corresponding threads and a locking edge; and
    rotating the replaceable cartridge in the pump cartridge body about a ¼ turn to a desired locking position so that the one or more protruding members rotationally couples with the one or more corresponding threads for grabbing, drawing and seating the replaceable cartridge in relation to the pump cartridge body, and so that the locking lever feature of the pre-loaded locking lever rotates past and securely engages the locking edge of the pump cartridge body and locks the replaceable cartridge in relation to the pump cartridge body.

11. A method according to claim 10, wherein the pre-loaded locking lever is spring-loaded and pivotally arranged on the replaceable cartridge to snap into place and lock the replaceable cartridge when the locking lever is rotated past the locking edge, so that the replaceable cartridge may be installed in the pump cartridge body using one hand.

12. A method according to claim 10, wherein the pre-loaded locking lever is first pressed inwardly, then twisted in order to remove the replaceable cartridge from the pump cartridge body, so that the replaceable cartridge may be removed from the pump cartridge body using one hand.

13. A method according to claim 10, wherein the pre-loaded locking lever has a housing having lever pivot points and contains a spring.

14. A method according to claim 10, wherein the pre-loaded locking lever includes a bias member, such as a spring or other suitable elastic member or material, for continuously urging the pre-loaded locking lever against the replaceable cartridge.

15. A method according to claim 10, wherein the locking edge is formed on an annular rim on the pump cartridge body as a raised edge.

16. A method according to claim 10, wherein the pre-loaded locking lever makes an audible latch verification sound when the pre-loaded locking lever is coupled to the locking edge as the replaceable cartridge is seated and securely fastened in the pump cartridge body, allowing the user to easily secure the replaceable cartridge in areas not readily accessible and in some cases not visible.

17. A method according to claim 10, wherein the replaceable cartridge has a rubber type over-mold that allows for a firm grip in a wet environment which enhances the removal and installation of the replaceable cartridge.

18. A method according to claim 10, wherein the pump is a livewell/baitwell pump.

* * * * *